(12) United States Patent
Koh

(10) Patent No.: US 6,454,985 B1
(45) Date of Patent: Sep. 24, 2002

(54) METHOD FOR MAKING PLANT-CULTIVATING VESSELS FROM EXCRETIVE SLUDGE OF DOMESTIC ANIMALS

(75) Inventor: Meeng-Ter Koh, Tainan (TW)

(73) Assignee: Cheng-Taung Wang, Tainan (TW)

( * ) Notice: Subject to any disclaimer, the term of this patent is extended or adjusted under 35 U.S.C. 154(b) by 184 days.

(21) Appl. No.: 09/584,703

(22) Filed: Jun. 1, 2000

(51) Int. Cl.[7] .................... A01G 9/02; A01G 9/10; B01D 21/00; B29C 39/38; C02F 3/02
(52) U.S. Cl. .................... 264/330; 210/605; 210/620; 210/800
(58) Field of Search .................... 264/330; 210/605, 210/620, 800

(56) References Cited

U.S. PATENT DOCUMENTS 4,021,966 A * 5/1977 Rimpinen et al. .............. 47/86

OTHER PUBLICATIONS

Abstract of CN 1265266–A (published Sep. 6, 2000).*

* cited by examiner

Primary Examiner—Leo B. Tentoni
(74) Attorney, Agent, or Firm—Rosenberg, Klein & Lee

(57) ABSTRACT

A method for making plant-cultivating vessels from excretive sludge of domestic animals includes picking a wet sludge containing 78%~83% of water and adding the wet sludge into a waste pulp tank. The combination of the wet sludge and waste pulp is stirred and then filled into a mold for making vessels. The mold is baked and the formed vessel is removed from the mold after formation. The vessel so made may be combined with the soil after decomposition without any treatment, which is advantageous for cultivation of flowering plants and primary cultivation of plants. An environment-protective and waste-reusing product is provided accordingly.

3 Claims, 1 Drawing Sheet

METHOD FOR MAKING PLANT-CULTIVATING VESSELS FROM EXCRETIVE SLUDGE OF DOMESTIC ANIMALS

BACKGROUND OF THE INVENTION

1. Field of the Invention

The present invention relates to a method for making plant-cultivating vessels from excretive sludge of domestic animals.

2. Description of the Related Art

Livestock industry still plays a role in modern world and pig raising is a role of livestock industry. Nevertheless, pig raising causes pollution and is thus detrimental to the environment and adversely affects the relations and interactions between organisms and their environment. The excretive waste of pigs that must be processed at first priority is sludge, including primary sludge, anaerobic sludge, and activated sludge. The sludge comprises soluble and insoluble solids, suspended fixed and microorganisms, and undecomposed pig feces is the main problem. An adult pig excretes dry sludge in the amount of 0.01 kg per day, and the accumulative volume for the whole pig-raising site is very large. A conventional solution for the sludge is circulating a part of the sludge and cleaning the rest of the sludge, yet the circulating part of the sludge still requires treatment.

The excretion of pig feces contains organic wasted water of high concentration, and the sludge contains organisms full of nitrogen and phosphorous. The present invention is intended to provide a method for solving above problems and efficiently using the waste of pig raising.

SUMMARY OF THE INVENTION

It is a primary object of the present invention to provide a method for making plant-cultivating vessels from excretive waste of domestic animals. The sludge is concentrated efficiently and recovered for making plant-cultivating vessels.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
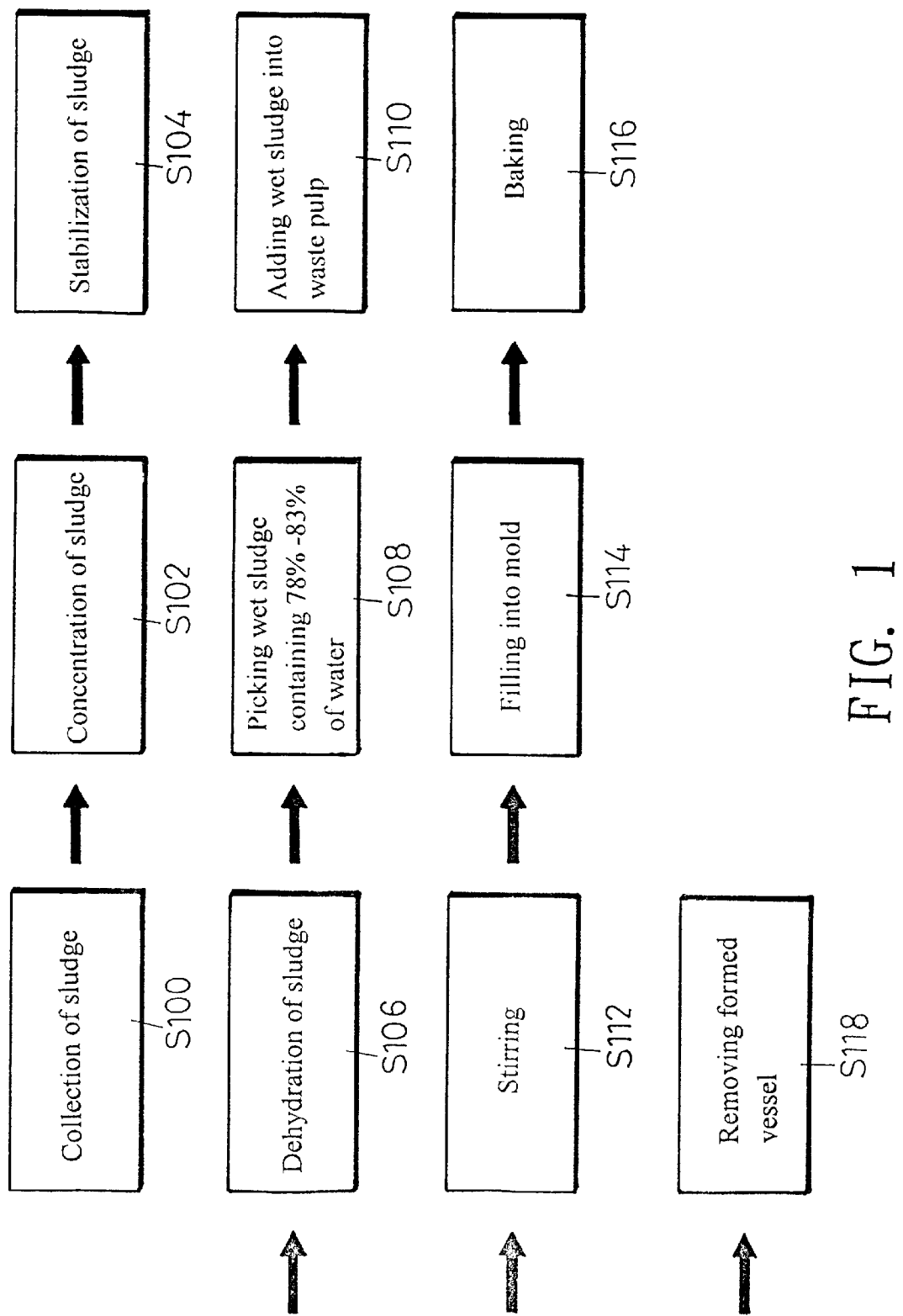
FIG. 1 is a flow chart illustrating a method for making plant-cultivating vessels from excretive waste of domestic animals in accordance with the present invention.

Referring to FIG. 1, a method in accordance with the present invention is provided for making plant-cultivating vessels from excretive waste of domestic animals. The term "excretive waste" used herein means the feces and urine of pigs (or other domestic animals) combined with water or any substances in the pig-raising site. The term "sludge" or "excretive sludge" means the solid portion of the excretive waste. The method in accordance with the present invention includes a first step of collecting sludge. The sludge in an excretive waste handling plant is generally sunk in a deposit tank (not shown) and an anaerobic tank (not shown) and must be collected into a sludge-concentrating tank (not shown) (Step 100). A motor (not shown) is used to convey the sludge to the sludge-concentrating tank (not shown) via plastic pipes (not shown).

The sludge-concentrating tank includes a conic bottom. After the sludge deposits, the supernatant is circulated back to an adjusting tank (not shown) or water tank (not shown). The concentration of the sludge is increased by at least 3% under the gravitational deposition (Step 102). The water content is reduced to thereby reduce the volume.

Mounted in a storage tank (not shown) for the concentrated sludge is an aerobic instrument (not shown). The remaining gas of the activated sludge after treatment by the aerobic instrument is directly inputted into the storage tank and then processed by an aerobic treatment for speeding the stabilization of the sludge (Step 104). It is found in tests that the unpleasant odor vanishes to a certain extent after four days of aerobic treatment.

Next, the sludge is dehydrated by, e.g., a belt filter (not shown) (Step 106). High molecular weight polymers are added to condense the sludge for facilitating the dehydration. The water is drained by gravity after dehydration by the belt filter.

Next, wet sludge containing 78%~83% of water is picked (Step 108) and an appropriate amount of the wet sludge is added into a waste pulp tank (not shown) (Step 110). The mixing ratio between the wet sludge and the waste pulp is about 40%:60% (with an acceptable error within 15%).

The combination of wet sludge and waste pulp is stirred (Step 112) and then filled into a mold (not shown) for making vessels (Step 114). After baking (Step 116), formed vessel is removed from the mold (Step 118). The vessels so made include ordinary vessels and holed plates having a lattice structure for cultivating plants.

It is known that the pig feces contain a large amount of organic ingredients that can be absorbed and utilized by plants after decomposition. The sludge can be used to make the vessels and holed plates for cultivating plants in gardening to replace plastic vessels.

The sludge contains few fibers and waste pulp is thus added into the sludge to increase the fiber content for making vessels and holed plates. The productivity depends largely on the mixing ratio between the wet sludge and the waste pulp. In tests, formation and baking of the vessels made of the wet sludge/waste pulp combinations containing 10%, 10%, 30%, 40%, 50%, 60%, 70%, and 80% of wet sludge, respectively are observed. It is found that the best productivity for the vessels can be obtained when using a combination containing 40% of wet sludge and 40% of waste pulp. The holes in a holed plate are smaller, and the combination may contain wet sludge of more than 80%. Yet, the resultant plate is thinner and thus tends to deform. It was found that the best mixing ratio between the wet sludge and the waste pulp is 50%:50%.

The vessels and holed plates made from the sludge are used to cultivate orchid. For a vessel of 3.5 inches in diameter so made for cultivating a butterfly orchid, observation of the flowering and development of the root as well as decomposition of the vessel shows that the flowering rate is increased by 10%~20% although there are only slight differences in the number of leaves, leaf width, and leaf length when compared with a butterfly orchid cultivated in a plastic vessel. The root of the orchid may extend out of the vessel and is thus longer and larger. The root of the orchid reaches out of the vessel after three months, and the vessel made of sludge begins to grow mold and decompose. The vessel will be damaged if it is picked up by hands. The vessel made of sludge is decomposed in the eighth month. At this time, the orchid is moved to an appropriate place without the need of breaking the vessel that has been decomposed already.

For a holed plate having 128 lattices, it is used to cultivate all kinds of vegetables during tests. In a test of cultivating cabbages with a comparative example of cultivating cabbages by a plastic plate having 128 lattices under the same green house condition, the roots of the cabbages cultivated by the plate made of sludge may reach out of the plate and the whole plate may be buried into the soil without removing the cabbages which may adversely affect growth of the roots of the cabbages.

Thus, the vessel made of sludge and the plate made of sludge have the advantage of decomposability such that the vessel and plate may be combined with the soil after decomposition without any treatment, which is advantageous for cultivation of flowering plants and primary cultivation of plants. Accordingly, an environment-protective product is provided.

Although the invention has been explained in relation to its preferred embodiment, it is to be understood that many other possible modifications and variations can be made without departing from the spirit and scope of the invention as hereinafter claimed.

What is claimed is:

1. A method for making plant-cultivating vessels from excretive sludge of domestic animals, the method comprising the steps of:

collecting sludge;

concentrating the sludge;

stabilizing the sludge;

dehydrating the sludge;

picking wet sludge containing 78%–83% of water;

adding the wet sludge into a waste pulp container, wherein the mixing ratio of the wet sludge and the waste pulp is in the approximate range of 25%–40%: 75%–60%;

stirring the combination of the wet sludge and the waste pulp;

filling the stirred combination of the wet sludge and the waste pulp into a mold for making vessels for cultivating plants;

baking the mold; and removing formed vessel from the mold.

2. The method as claimed in claim 1, wherein the mixing ratio of the wet sludge and the waste pulp is in the approximate range of 35%–40%:65%–60%.

3. The method as claimed in claim 1, wherein the mixing ratio of the wet sludge and the waste pulp is 50%:50%.

* * * * *